United States Patent [19]
Jarvenkyla

[11] Patent Number: 6,149,756
[45] Date of Patent: Nov. 21, 2000

[54] METHOD FOR JOINING PLASTIC PIPES, A JOINT RING USED IN THE JOINING AND A PIPE JOINT PROVIDED WITH THE METHOD

[75] Inventor: Jyri Jarvenkyla, Hollola, Finland

[73] Assignee: Uponor Innovation AB, Fristad, Sweden

[21] Appl. No.: 09/125,712

[22] PCT Filed: Mar. 4, 1997

[86] PCT No.: PCT/FI97/00142

§ 371 Date: Aug. 24, 1998

§ 102(e) Date: Aug. 24, 1998

[87] PCT Pub. No.: WO97/33121

PCT Pub. Date: Sep. 12, 1997

[30] Foreign Application Priority Data

Mar. 5, 1996 [FI] Finland ................................. 961020

[51] Int. Cl.[7] .......................... H05B 3/06; B32B 31/24; F16L 13/02
[52] U.S. Cl. ................................ 156/273.9; 156/274.2; 156/294; 285/21.2; 219/535; 219/544; 219/547
[58] Field of Search ........................... 156/273.9, 274.2, 156/304.2, 304.6, 294; 219/535, 542, 544, 546, 547; 285/21.1, 21.2, 903

[56] References Cited

U.S. PATENT DOCUMENTS

| 4,234,781 | 11/1980 | Flink | 219/243 |
|---|---|---|---|
| 4,852,914 | 8/1989 | Lyall | 285/21 |
| 5,386,101 | 1/1995 | Steinmetz et al. | 219/535 |
| 5,407,520 | 4/1995 | Butts et al. | 156/274.2 |
| 5,410,131 | 3/1995 | Brunet et al. | 156/273.9 |

FOREIGN PATENT DOCUMENTS

| 169793 | 2/1995 | Denmark . |
|---|---|---|
| 0278768 | 8/1988 | European Pat. Off. . |
| 0435044 | 7/1991 | European Pat. Off. . |
| 62785 | 11/1978 | Finland . |
| 3226575 | 3/1984 | Germany . |
| 3720577 | 2/1988 | Germany . |
| 411862 | 2/1980 | Sweden . |
| 685814 | 10/1995 | Switzerland . |

*Primary Examiner*—Michael W. Ball
*Assistant Examiner*—Michael A Tolin
*Attorney, Agent, or Firm*—Ladas & Parry

[57] ABSTRACT

A method for joining a first tubular member to a second tubular member. The method provides a stretchable and compressible welding ring having a flexible inner ring, a resistance coil wound around the inner ring and at least one layer of plastic coating the resistance coil. The method includes the step of arranging the first and second tubular members in overlapping relation with an end of the first tubular member inserted into an end of the second tubular member and with the welding ring encircling the first tubular member and compressed between the first and second tubular members. The method also includes the step of applying electric energy to the resistance coil to melt the at least one layer of plastic so that, upon cooling, the respective ends of the first and second tubular members are welded to the welding ring.

19 Claims, 2 Drawing Sheets

METHOD FOR JOINING PLASTIC PIPES, A JOINT RING USED IN THE JOINING AND A PIPE JOINT PROVIDED WITH THE METHOD

FIELD OF INVENTION

The invention relates to a method for joining a plastic pipe, a joint ring, and a plastic pipe joint, wherein either a smooth pipe or a non-smooth pipe, such as a ribbed pipe, a corrugated pipe or the like, is attached to the inner surface of another plastic pipe or a sleeve.

BACKGROUND OF THE INVENTION

A conventional fastening manner in sleeve-coupling type joints is a joint utilizing a rubber ring, wherein one or several rings are positioned between the ribs of a ribbed pipe or the corrugations of a corrugated pipe, for example, and the rings are pressed to the inner surface of the sleeve or pipe to be joined, the surface being formed to correspond to the profile of the rubber ring.

In addition to the rubber ring joints, ribbed pipes and corrugated pipes are also joined by welding. This is applicable especially for polyolefin pipes, which have excellent weldability properties. In the future, electric welding will be used more often. The essential feature in welding is that the temperature exceeds the melting point of plastic and that the welding pressure is sufficient. Known welding methods are disclosed for example in European patent application 531 750, U.S. Pat. No. 4,234,781 and in Finnish patent 87 685. In these methods, welding is performed by means of a welding ring placed between the pipes to be joined and electric current to be conducted to the ring. In the arrangement according to the aforementioned European reference, the required pressure is produced by moving the parts to be welded axially in relation to each other, whereas in the arrangements according to the aforementioned US and Finnish references the pressure results from the expansion of the welding ring.

However, the above-described welding manners are not applicable as such to the sleeve couplings of ribbed pipes, corrugated pipes or the like, intended for rubber ring joints, since the plastic welding ring to be tacked to the pipes to be welded cannot be placed in the space between the ribs of the ribbed pipe or the corrugations of the corrugated pipe even though this would be the best place for it in order to prevent the occurrence of detrimental axial forces in the joint. Another problem related to the welding of such light-construction pipes is that the welding pressure may deform a thin-walled pipe too much (cf. the support sleeve in Finnish patent 87 685).

SUMMARY OF THE INVENTION

The object of the present invention is to develop an alternative joining manner, based on the above-described arrangements, for the above-described pipe joint to supplement the conventional rubber ring joint.

A preferred and simple implementation of the invention is welding performed by means of only a plastic-coated resistance coil. This coil can easily be stretched over the ribs or corrugations and placed between them. The coil should naturally be such that its structure provides the necessary strength and the flexible properties. The invention can naturally also be applied in a joint wherein a welding ring is placed in a groove (gasket groove) provided in a sleeve or a pipe in order to weld a pipe with smooth walls. The welding ring can be successfully placed in the aforementioned groove if the ring bends sideways or inwards so that its circumference can be decreased.

A resistance coil coated preferably with plastic is placed around a flexible ring before it is mounted. When the welding ring thus consists of an inner part made of for example rubber, thermoplastic rubber or flexible plastic, and of a resistance coil wound around the inner part in the form of a coil, the inner part stretches and the coil gives in, so that the welding ring can be pulled over a rib or a corrugation without problems. The ductility of the inner part is typically in the range of 10 to 15% and the tensile strength is such that the aforementioned operation can be performed manually. In this structure, the flexible inner part produces a sufficient welding pressure both against the sides of the ribs or corrugations and against the inner surface of the sleeve, whereupon the resistance coil does not have to be as solid as if it were used alone.

In order to prevent the excessive deformation of a ribbed or corrugated pipe, either a cut plastic ring, the ends of which are positioned against each other in the groove, or a thermally insulating layer, such as a rubber ring with a flat cross-section, that prevents the excessive softening of the pipe's inner layer, is placed in the groove between the ribs or the corrugations before the assembly of the welding ring.

BRIEF DESCRIPTION OF THE DRAWINGS

In the following, the invention will be described in greater detail with reference to the accompanying drawings, in which.

DETAILED DESCRIPTION

Figure 3:
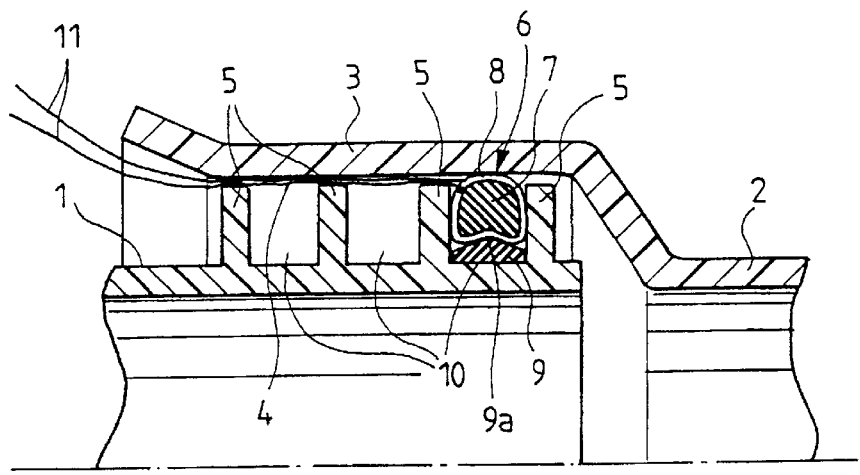
FIG. 3 is a longitudinal view of a ribbed pipe and a sleeve that are joined with the method according to the invention by using the welding ring of FIG. 1.

FIG. 3 shows a ribbed pipe 1 having an insert end that is inserted into an extension 3 of another pipe or a sleeve 2 and that is intended to be fastened to the inner surface 4 of this extension 3. Both pipes 1 and 2 have relatively thin walls and they can be made of for example polyolefin.

Figure 1:
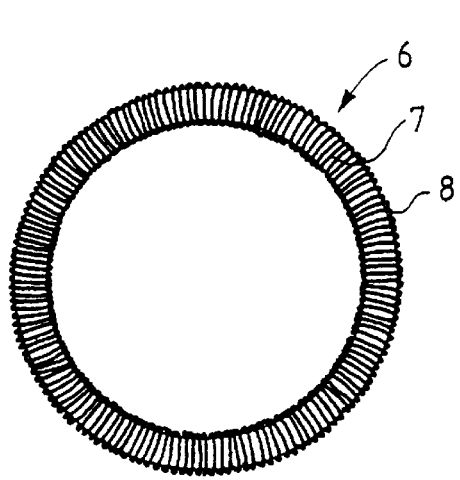
FIG. 1 shows an embodiment of a welding ring used in the method according to the invention.

In order to join the pipes permanently together, one welding ring 6 that is of the type shown in FIG. 1 is stretched in this example between the ribs 5 of the ribbed pipe 1 over the last rib, the welding ring comprising a flexible ring 7 made of for example rubber or plastic, and a plastic-coated resistance coil 8 wound around the ring.

Before the welding ring 6 is placed in the aforementioned gap between the ribs, a ring 9 that prevents the excessive deformation of the ribbed pipe 1 during welding is placed at the bottom of the rib gap, i.e. in a groove 10 between the ribs 5, the ring being for example a cut plastic ring the ends of which are positioned against each other in the groove 10. This ring 9 may also be a thermally insulating flexible integral ring that can be stretched over the ribs 5. The auxiliary ring 9 is preferably made of thermostable rubber, which is compressed when the joint arrangement is inserted into the sleeve, thus facilitating the formation of the welding pressure but preventing the excessive heating of the thin inner wall of the pipe 1 to be joined. The cross-section of the auxiliary ring 9 is preferably triangular or contains ridges or the like that direct the pressure of the flexible welding ring 6 towards the side ribs 5. Such an arrangement keeps the thrust of the insert end of the pipe 1 small, since there is room for the ring 6 to deform on both sides of a protrusion 9a provided in the auxiliary ring 9. Also, the arrangement provides simultaneously a high pressure directed upwards and sideways.

The welding of the pipes 1 and 2 together is performed simply by conducting an electric current into the resistance coil 8 via conducting wires 11, whereupon the plastic material coating the coil and the pipe sections touching the coil melt and are welded into one integral piece. In this case, the flexible ring 7 provides the pressure required for the welding.

Figure 2:
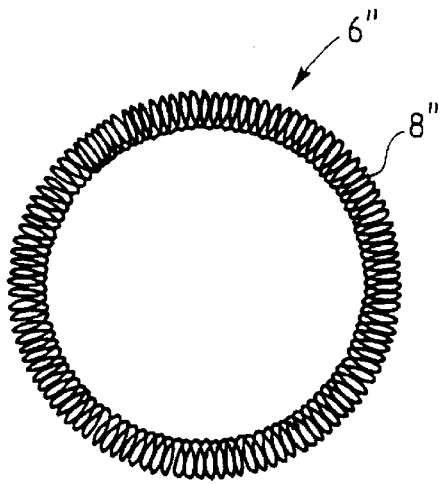
FIG. 2 shows another embodiment of a welding ring used in the method according to the invention.

The arrangement 6" of FIG. 2 may also be used as a welding ring, whereupon this structure only comprises the resistance coil 8". This simplified structure is possible when the resistance coil 8" is not only flexible, but sufficiently strong to provide the pressure required in the welding.

Figure 4:
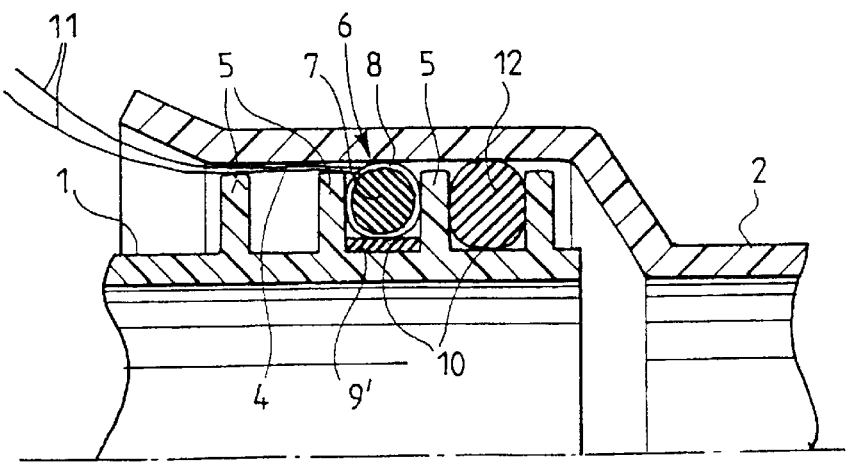
FIG. 4 is a longitudinal view of a ribbed pipe and a sleeve that are joined with the method according to the invention by using the welding ring of FIG. 1 in an alternative manner.

FIG. 4 shows an alternative manner for joining the aforementioned pipes 1 and 2. It differs from the arrangement of FIG. 3 only in that the welding ring 6 and the substantially rectangular protective ring 9' situated below are now placed in another groove 10, and the first groove 10 contains a conventional flexible joint ring 12 made of for example rubber. This arrangement provides the joint with absolute tightness. In such a case, the electrical joint ring, i.e. the welding ring, 6 is not required to be absolutely tight, and it is thus possible to provide a cheaper construction. The welding ring 6 protects the rubber ring 12 from dirt and provides the axial tensile strength which is important also in non-pressure pipes when for example the manner of assembly produces axial forces.

Figure 5:
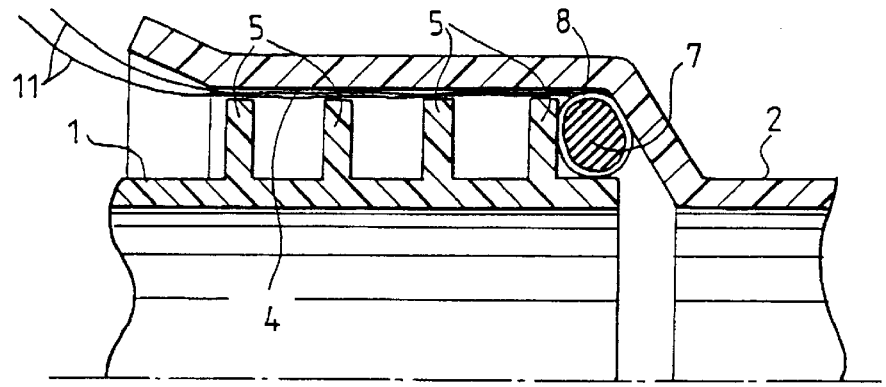
FIG. 5 is a longitudinal view of a ribbed pipe and a sleeve that are joined with the method according to the invention by using the welding ring of FIG. 1 in another alternative manner.

The arrangement of FIG. 5 in turn differs from the arrangement of FIG. 3 in that the welding ring 6 is positioned at the very tip of the insert end of the pipe 1 to be joined before the first groove 10 between the ribs 5, and the welding is primarily performed between the first rib 5 and the bottom of the extension 3. In such a case, the pipe arrangement must be naturally clamped during the welding in order to provide the welding pressure required. Especially in such a case the flexible inner ring 7 is very important, since it provides the resistance coil 8 with good contact also with an uneven faying surface.

Figure 6:
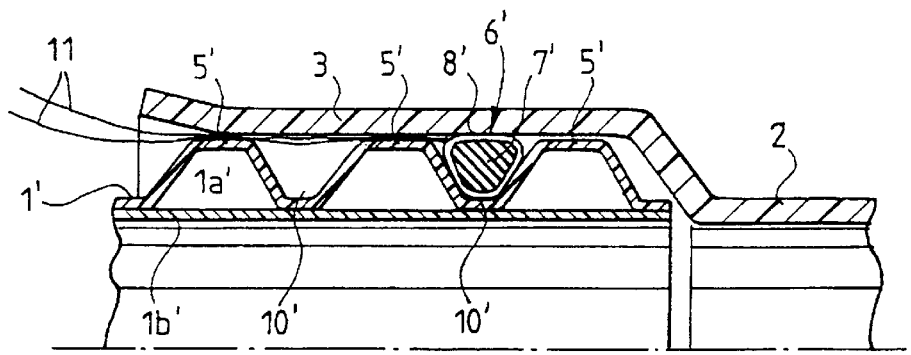
FIG. 6 is a longitudinal view of a two-layer corrugated pipe and a sleeve that are joined with the method according to the invention by using the welding ring substantially according to FIG. 1.

The joint shown in FIG. 6 is substantially similar to the one shown in FIG. 3, but in the former the pipe to be connected is a two-layer corrugated pipe 1' comprising a corrugated outer layer 1a' and a smooth inner layer 1b'. A welding ring 6' is placed in a groove 10' between the first two corrugations 5', and in this exemplary case it is without the protective ring at the bottom of the groove 10', even though the latter ring may be placed therein, if required. The cross-section of the welding ring 6' and the associated flexible inner ring 7' is substantially conical in order to provide as good tightness as possible for the joint.

Figure 7:
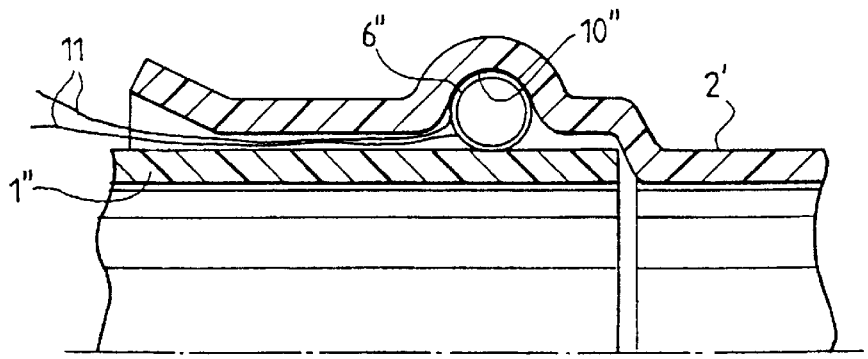
FIG. 7 is a longitudinal view of a smooth pipe and a pipe provided with a gasket groove, joined by using the welding ring substantially according to FIG. 2.

In the joint shown in FIG. 7, a smooth-walled plastic pipe 1" is joined to a sleeve 2' provided with a gasket groove 10". A welding ring 6" which consists only of a resistance coil 8" is placed in the groove 10". Placing the welding ring 6", i.e. the resistance coil 8", in the groove 10" is possible since the diameter of the resistance coil 8" can be decreased and bent sideways due to the flexibility and compressibility of the coil. The parts 1", 2' and 8" are welded together as described above. In this case, it is also possible to use the above-described welding ring provided with a flexible inner ring.

The above-described joints can be made such that the joint is produced mainly by means of the welding ring 6, 6' without welding the pipes 1; 1, 2 substantially together. The selection of the welding ring 6, 6' thus affects the mechanical rigidity of the joint, i.e. especially when the material of the flexible ring 7, 7' situated inside the welding ring 6, 6' is very soft and the resistance wire of the resistance coil 8, 8' is thin, the joint allows the relative movement between the pipes to some extent but still remains tight, however.

The electric wires 11 required in the welding are conducted out of the sleeve in a conventional manner trusting that the tolerances are sufficient, since the wires 11 are thin after the primary insulation has been removed. On the other hand, it is easy to provide at least the relatively thin fixed ribs 5 of the ribbed pipe 1 with notches which are punched with a knife and through which the wires 11 are conducted out of the pipe.

Figure 8:
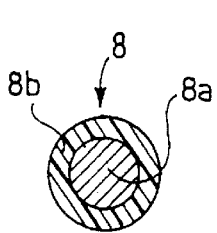
FIG. 8 is a cross-section of a resistance coil according to the invention.

The actual resistance wire 8a, 8a''' (FIGS. 7 and 8) of the resistance coil may be coated not only with a round plastic coating 8b as in FIG. 7, but also for example with a conical plastic coating 8b''' as in FIG. 8.

The plastic coating 8b, 8b''' may comprise several layers (not shown in the drawings), whereupon the inner plastic layer may be made of higher-melting plastic material than the other layers, thus preventing the danger of a local short circuit in the coil. The outermost layer is usually made of the same material as the faying surfaces. Different materials (such as polyethylene and polypropylene) may be welded to some extent in such a way that the outermost layer is of a material that is a mixture of the raw materials of the faying surfaces, and the components of each mixture have been processed in such a way that they are intermixable.

The resistance wire 8a, 8a''' may be of a material that has the characteristics of a spring, so that it maintains its shape easily.

Figure 9:
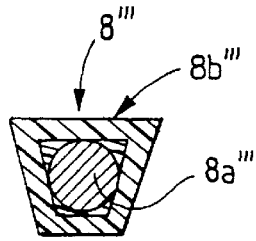
FIG. 9 is a cross-section of another resistance coil according to the invention.
Figure 10:
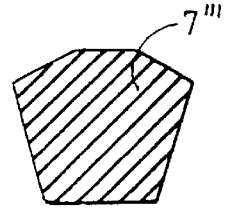
FIG. 10 shows an alternative embodiment of a flexible ring according to the invention provided inside the resistance coil.

The flexible inner ring 7, 7' is preferably made of fluoropolymer, which stands more heat than the welding temperature requires. On top of this ring there may be a thin extruded plastic layer (not shown in the drawings) that yields during stretching but melts during welding. The cross-sectional shape of this ring may differ from circular, such as the ring 7' of FIG. 6 or the ring 7''' of FIG. 9.

The resistance coil 8, 8', 8", 8''' may be designed in such a way that when its layers are tightly joined, an inner diameter substantially corresponding to the outer diameter of the joint surface is formed. In this case, even though there is a flexible ring 7, 7' inside, the inner diameter of the ring cannot become too small, since the turns of the resistance coil are supported on each other tightly. Alternatively, the resultant inner diameter may be slightly smaller than the diameter of the joint surface so that the ring 7, 7' provides slight compression.

The welding ring 6, 6' can be formed normally by winding a plastic-coated resistance wire around a ring 7, 7', but also in such a way that a straight flexible profile is extruded, a resistance wire is continuously wound around the profile, the profile and the wire are cut, the wire is opened to some extent, the profile is stretched a little, and the ends of the profile are welded or glued together. A suitably flexible profile compresses about 30% as a result of a light insertion force.

The invention is described above by means of only a few preferred embodiments. A person skilled in the art may realize the details of the invention in several alternative manners, however, within the scope of the appended claims. Therefore, there may be for example welding rings between several ribs or corrugations, if necessary. Induction heating is also a useful alternative in heating the welding ring. The outer layer of the welding ring may also form a casing that is not removed during the assembly.

What is claimed is:

1. A method for joining a first tubular member having an outer surface to a second tubular member having an inner surface, said method comprising:
   (a) providing a stretchable and compressible welding ring comprising a flexible inner ring, a resistance coil wound around the inner ring and at least one layer of plastic coating the resistance coil, said welding ring being sufficiently stretchable to stretch over a rib of a ribbed pipe having a plurality of ribs or a corrugation of a corrugated pipe having a plurality of corrugations whereby it can be placed in a space or groove between the ribs or corrugations, said inner ring comprising a material that imparts pressure against the outer surface of the first tubular member and the inner surface of the second tubular member with the welding ring encircling the first tubular member and compressed between the first and second tubular members;
   (b) arranging the first and second tubular members in overlapping relation with an end of the first tubular member inserted into an end of the second tubular member and with the welding ring encircling the first tubular member and compressed between the respective ends of the first and second tubular members;
   (c) applying electric energy to the resistance coil to melt the at least one layer of plastic so that, upon cooling, the respective ends of the first and second tubular members are welded to the welding ring.

2. A method according to claim 1, wherein the welding ring comprises a plurality of layers of plastic coating the resistance coil.

3. A method according to claim 1, wherein the first tubular member has a plurality of alternating ridges and grooves, said welding ring being arranged in step (b) in one of the grooves in the first tubular member.

4. A method according to claim 3, wherein the welding ring is arranged in said one groove by stretching or bending it over one of the ridges.

5. A method according to claim 1, wherein the second tubular member comprises a groove therein, said welding ring being arranged in step (b) in the groove in the second tubular member.

6. A method according to claim 1, wherein a cut plastic ring is placed between the welding ring and the first tubular member in step (b) to prevent excessive deformation of the first tubular member with the welding ring compressed between the first and second tubular members.

7. A method according to claim 1, wherein a thermal insulating layer is placed between the welding ring and the first tubular member in step (b) to prevent excessive softening of the first tubular member with the welding ring compressed between the first and second tubular members.

8. A method according to claim 1, wherein a flexible joint ring of rubber or plastic is placed between the welding ring and the first tubular member in step (b).

9. An article comprising:
   (a) a first tubular member comprising an outer surface;
   (b) a second tubular member comprising an inner surface;
   (c) a stretchable and compressible welding ring stretched around the first tubular member and compressed between the first and second tubular members; said welding ring being sufficiently stretchable to stretch over a rib of a ribbed pipe having a plurality of ribs or a corrugation of a corrugated pipe having a plurality of corrugations whereby it can be placed in a space or groove between the ribs or corrugations, said welding ring comprising (i) a flexible inner ring, (ii) a resistance coil wound around the inner ring and (iii) at least one layer of plastic coating the resistance coil; said inner ring comprising means for imparting pressure against the outer surface and against the inner surface with the welding ring stretched around the first tubular member and compressed between the first and second tubular members, each of said first and second tubular members being welded to the welding ring substantially without being welded to each other.

10. An article according to claim 9, wherein the first tubular member comprises a plurality of alternating ridges and grooves, said welding ring being disposed in one of the grooves.

11. An article according to claim 9, wherein the second tubular member comprises a groove, said welding ring being disposed in the groove.

12. A joint ring for joining a first tubular member comprising an outer surface to a second tubular member comprising an inner surface, the joint ring comprising a stretchable and compressible welding ring, said welding ring comprising a flexible inner ring, a resistance coil wound around the inner ring and at least one layer of plastic coating the resistance coil, said inner ring comprising means for imparting pressure against the outer surface of the first tubular member and the inner surface of the second tubular member with the welding ring stretched around the first tubular member and compressed between the first and second tubular members, said welding ring being sufficiently stretchable to stretch over a rib of a ribbed pipe having a plurality of ribs or a corrugation of a corrugated pipe having a plurality of corrugations whereby it can be placed in a space or groove between the ribs or corrugations.

13. A joint ring according to claim 12, wherein the welding ring comprises a plurality of layers of plastic coating the resistance coil.

14. A joint ring according to claim 13, wherein a first of the plurality of layers closest to the resistance coil has a higher melting point than other of the plurality of layers.

15. A joint ring according to claim 12, wherein the at least one layer of plastic coating has a conical cross-section.

16. A joint ring according to claim 12, wherein the resistance coil consists of a spring-like material.

17. A joint ring according to claim 12, wherein the inner ring is coated with a thin layer of extruded plastic.

18. A joint ring according to claim 12, wherein the inner ring comprises a fluropolymer.

19. A joint ring according to claim 12, wherein the inner ring has a ductility in a range of about 10–15%.

* * * * *